March 8, 1932.   R. DOS SANTOS   1,848,577
BREAD BOX
Filed April 23, 1931   2 Sheets-Sheet 1

Inventor
Roal Dos Santos
By Clarence A. O'Brien
Attorney

March 8, 1932. R. DOS SANTOS 1,848,577
BREAD BOX
Filed April 23, 1931   2 Sheets-Sheet 2
Fig. 2.
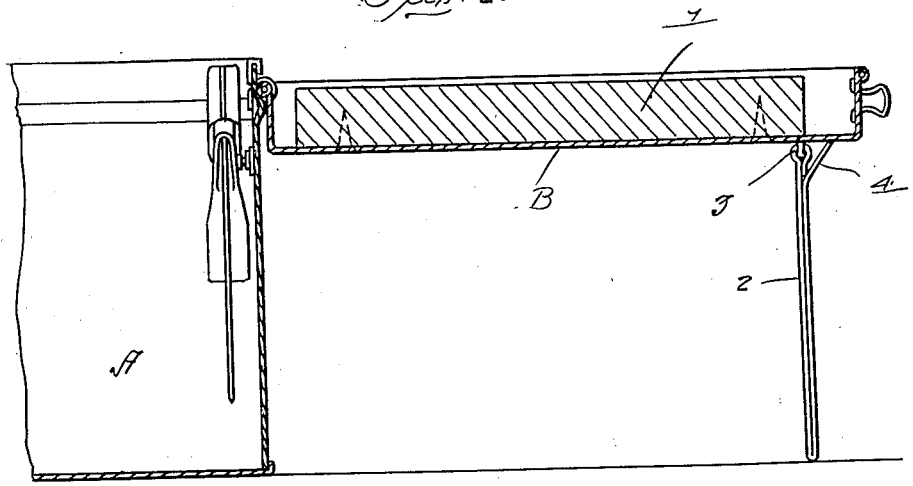
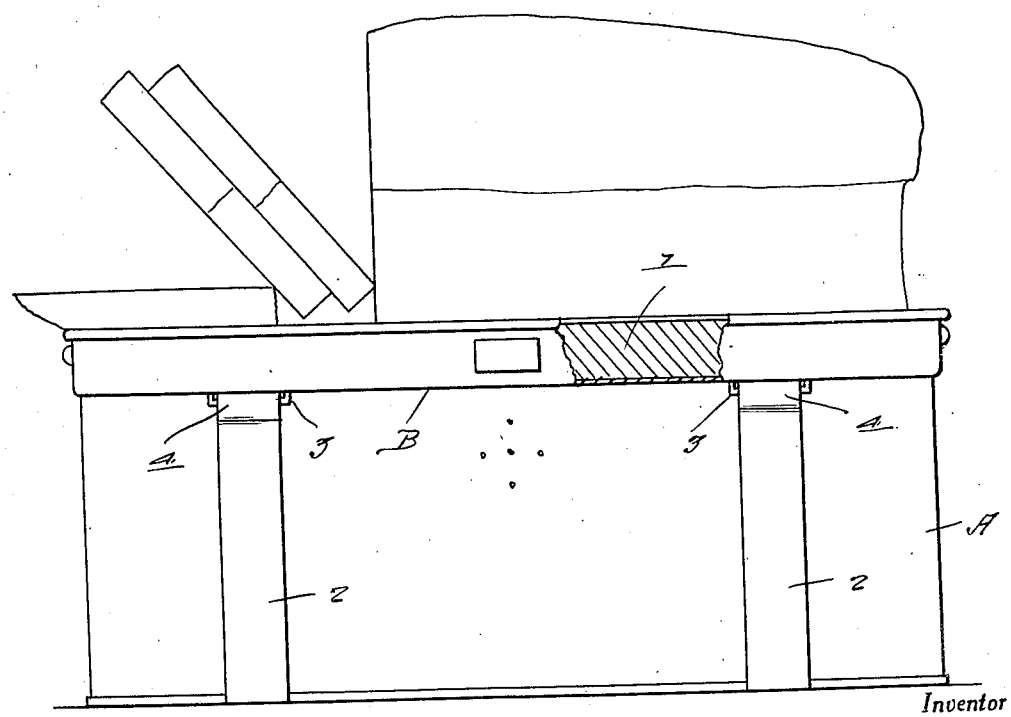
Fig. 3.
Inventor
Roal Dos Santos
By Clarence A. O'Brien
Attorney Patented Mar. 8, 1932

1,848,577

UNITED STATES PATENT OFFICE

ROAL DOS SANTOS, OF HONOLULU, TERRITORY OF HAWAII

BREAD BOX

Application filed April 23, 1931. Serial No. 532,329.

This invention relates to a bread box, the general object of the invention being to provide means whereby the cover of the box will act as a bread board from which the bread can be sliced when the same is moved to open position by providing the top of the box with a board on its inner face and end legs on its outer face which automatically drop into supporting position when the cover is moved to open position so as to hold the cover in horizontal position with the board ready to receive the loaf so that slices can be cut from the loaf.

Another object of the invention is to provide a pivoted holder in the box for the bread knife with means whereby the holder will move to a position to place the handle of the knife in accessible position when the cover is moved to open position, so that the knife can be readily grasped and removed from the holder.

This invention also consists in certain other features of construction and in the combination and arrangement of the several parts, to be hereinafter fully described and illustrated in the accompanying drawings, and specifically pointed out in the appended claims.

In describing the invention in detail, reference will be had to the accompanying drawings wherein like characters denote like or corresponding parts thruout the several views and in which:—

Fig. 2 is a section on the line 2—2 of Fig. 1.

Fig. 3 is a side view with parts broken away showing the loaf on the board with some slices cut therefrom.

In these drawings, the bread box is shown at A and its hinge cover at B. A board 1 is attached to the inner face of the cover and legs 2 are hingedly connected to the outer face of the cover as shown at 3, these legs being so formed that they will automatically drop into vertical position when the cover is moved to open position, so as to support the cover in horizontal position with the board 1 uppermost whereby the loaf can be taken from the box and placed on the board so that slices can be cut therefrom as shown in Fig. 3.

Each leg is provided with a diagonal part 4 adjacent its end which prevents the leg from movement beyond a vertical position, as this part will engage the cover and thus hold the leg in vertical position until the cover is moved to closed position when the leg will fold over upon the top of the cover.

Figure 1:
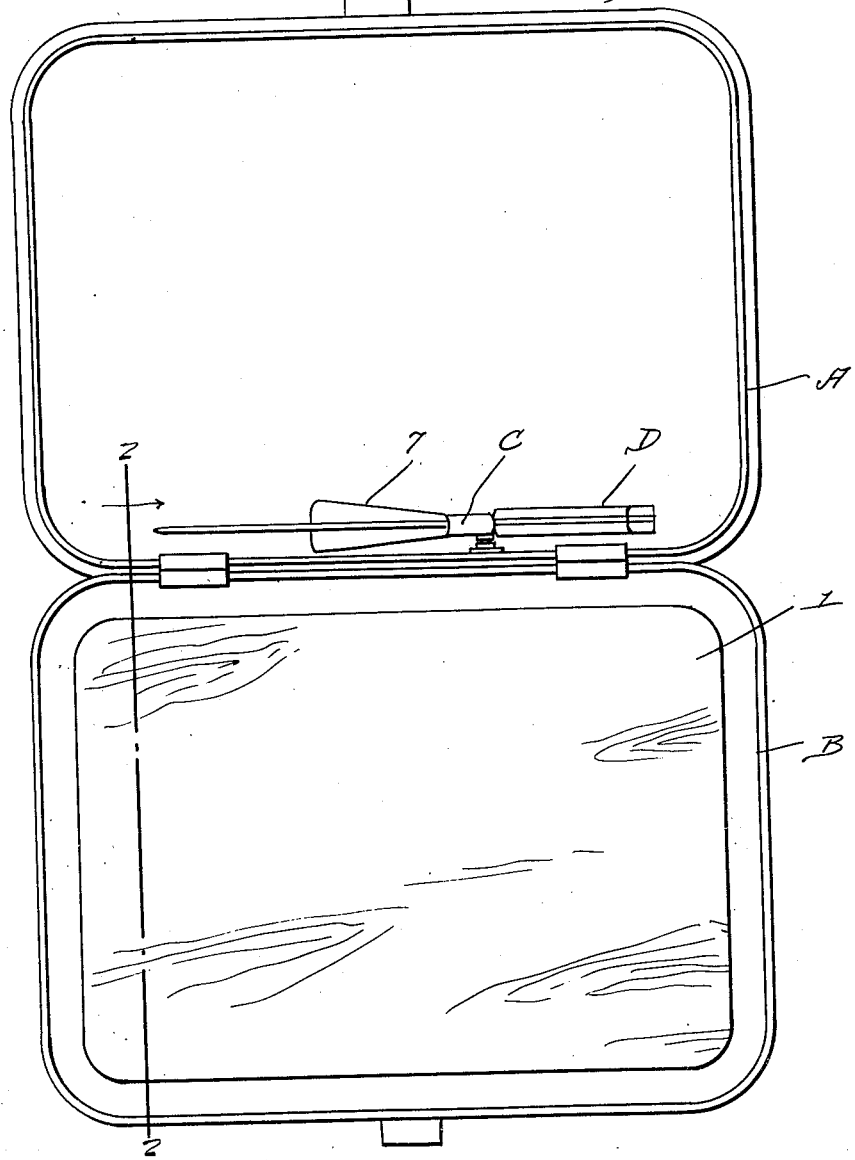
Figure 1 is a top plan view showing the cover in open position.
Figure 4:
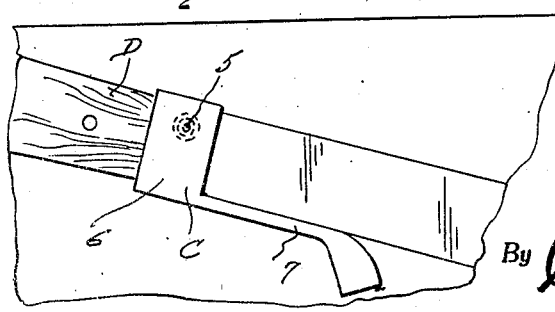
Fig. 4 is a detail view showing the pivoted knife holder.

A knife holder C is pivoted to an inner wall of the box as shown at 5 and this holder is formed of a looped part 6 having an extension 7 having its outer end bent downwardly, so that the knife D can be inserted in the loop part with part of the blade resting on the extension 7 as shown in Figs. 2 and 4. The holder is so arranged that as the cover is moved to open position, the holder will automatically tilt to a position where the handle of the knife will project from the box so that it can be readily grasped and drawn from the holder and used for cutting slices from the loaf.

As the cover is moved to a closed position, it will strike the handle and lower the parts into the box.

From the foregoing it will be seen that I have provided a board and a knife placed in the box and forming parts of the same so that the knife and board will be used only for cutting bread and not for other purposes, which tend to impart flavors of other articles to the bread when a board and knife are used for cutting other articles and to cut the bread.

The device is also a time saver as both the board and knife are readily at hand when the cover is moved to open position.

It is thought from the foregoing description that the advantages and novel features of the invention will be readily apparent.

It is to be understood that changes may be made in the combination and in the construction and arrangement of the several parts, provided that such changes fall within the scope of the appended claims.

Having thus described my invention, what I claim as new is:—

1. In combination with a bread box and a cover, a board fastened to the inner face of the cover, a leg hingedly connected with the top face of the cover adjacent its free edge, and swinging to vertical position when the cover is moved to open position whereby the leg will support the cover in horizontal position with the board ready to receive a loaf, and means for preventing the leg from unfolding beyond a vertical position.

2. In combination with a bread box and a hinged cover, a board fastened to the inner face of the cover, legs hingedly connected to the outer face of the cover adjacent the free end of the cover, and swinging to a vertical position when the cover is moved to an open position whereby the legs will hold the cover in horizontal position, and braces on the legs engaging a part of the cover when the legs move to a vertical position to prevent the legs from moving beyond a vertical position.

3. A bread box having a knife holder pivotally connected to one wall thereof, said holder receiving a knife in an unbalanced manner thereby causing the handle of the knife to be projected from the box when the cover is opened and to be moved to a position by the cover when the same is closed to occupy a position within the box.

4. A bread box having a hinged cover, a board on the inner face of the cover, legs hingedly connected with the outer face of the cover and adjacent the free end thereof and moving to a vertical position when the cover is moved to open position whereby the legs will support the cover in horizontal position, a knife holder pivotally connected to one wall of the box and having an extension at the lower part for holding a knife in an unbalanced manner whereby the handle of the knife will project from the box when the cover is opened, and will be moved into the box when the cover is closed.

In testimony whereof I affix my signature.

ROAL dos SANTOS.